United States Patent
Cho

(10) Patent No.: US 11,727,605 B2
(45) Date of Patent: Aug. 15, 2023

(54) METHOD AND SYSTEM FOR CREATING VIRTUAL IMAGE BASED DEEP-LEARNING

(71) Applicant: NHN CLOUD CORPORATION, Gyeonggi-do (KR)

(72) Inventor: Myounghoon Cho, Gyeonggi-do (KR)

(73) Assignee: NHN CLOUD CORPORATION, Gyeonggi-Do (KR)

( * ) Notice: Subject to any disclaimer, the term of this patent is extended or adjusted under 35 U.S.C. 154(b) by 155 days.

(21) Appl. No.: 17/238,203

(22) Filed: Apr. 23, 2021

(65) Prior Publication Data
US 2021/0335021 A1 Oct. 28, 2021

(30) Foreign Application Priority Data
Apr. 23, 2020 (KR) .................. 10-2020-0049121

(51) Int. Cl.
*G06T 11/00* (2006.01)
*G06V 40/10* (2022.01)
*G06F 18/21* (2023.01)
*G06F 18/2431* (2023.01)

(52) U.S. Cl.
CPC ............ *G06T 11/00* (2013.01); *G06F 18/217* (2023.01); *G06F 18/2431* (2023.01); *G06V 40/103* (2022.01)

(58) Field of Classification Search
CPC .... G06T 11/00; G06V 40/103; G06K 9/6262; G06K 9/628
See application file for complete search history.

(56) References Cited

U.S. PATENT DOCUMENTS

| 10,949,960 | B2 | 3/2021 | Nina Paravecino et al. |
| 11,030,772 | B2 | 6/2021 | Dixit et al. |
| 11,069,150 | B2 | 7/2021 | Sminchisescu et al. |
| 11,107,232 | B2 | 8/2021 | Li |

(Continued)

FOREIGN PATENT DOCUMENTS

| CN | 109670444 | * 4/2019 | ......... G06K 9/00228 |
| EP | 3 576 017 | 12/2019 | |

(Continued)

OTHER PUBLICATIONS

Pumarola, Albert, et al. "Unsupervised person image synthesis in arbitrary poses." Proceedings of the IEEE conference on computer vision and pattern recognition. 2018. (Year: 2018).*

(Continued)

*Primary Examiner* — Xin Sheng
(74) *Attorney, Agent, or Firm* — Ladas & Parry, LLP

(57) ABSTRACT

A method and system for creating a virtual image based on deep learning according to an embodiment of the present disclosure creates a virtual image based on deep learning by an image application executed by a processor of a computing device, where the method comprises obtaining a plurality of product images with respect to one product; classifying the obtained product images into a plurality of categories according to different pose types; determining a target category from among the plurality of categories for which the virtual image is to be created; creating a virtual image of a first pose type matched to the determined target category based on at least one product image among the plurality of product images; and displaying the created virtual image.

15 Claims, 7 Drawing Sheets

(56) References Cited

U.S. PATENT DOCUMENTS

| | | | |
|---|---|---|---|
| 11,334,975 | B2 | 5/2022 | Nina Paravecino et al. |
| 2019/0304076 | A1 | 10/2019 | Nina Paravecino et al. |
| 2019/0355147 | A1 | 11/2019 | Li |
| 2019/0371080 | A1 | 12/2019 | Sminchisescu et al. |
| 2020/0074299 | A1 | 3/2020 | Cho |
| 2020/0380720 | A1 | 12/2020 | Dixit et al. |
| 2021/0104029 | A1 | 4/2021 | Nina Paravecino et al. |
| 2021/0232858 | A1* | 7/2021 | Mukherjee ................ G06T 7/70 |

FOREIGN PATENT DOCUMENTS

| | | |
|---|---|---|
| JP | 2019-204476 | 11/2019 |
| JP | 2020-38640 | 3/2020 |
| KR | 10-2016-0046471 | 4/2016 |
| KR | 10-2020-0027093 | 3/2020 |

OTHER PUBLICATIONS

Office Action dated Jul. 19, 2022 for Korean Patent Application No. 10-2020-0049121 and its English translation from Global Dossier.

Albert Pumarola et al.: "Unsupervised Person Image Synthesis in Arbitrary Poses", arXiv:1809.10280v1 [cs.CV], Sep. 27, 2018, see pp. 1-9.

Office Action dated Jun. 21, 2022 for Japenese Patent Application No. 2021-073577 and its English translation from Global Dossier.

Nakada et al.: "Arbitrary Character Image Generation in Arbitrary Poses using Neural Network", IEICE Technical Report, the $118^{th}$ vol. No. 513, Japan, general incorporated foundation Institute of Electronics, Information and Communication Engineers, Mar. 10, 2019, pp. 73-78.

* cited by examiner

[FIG. 1]
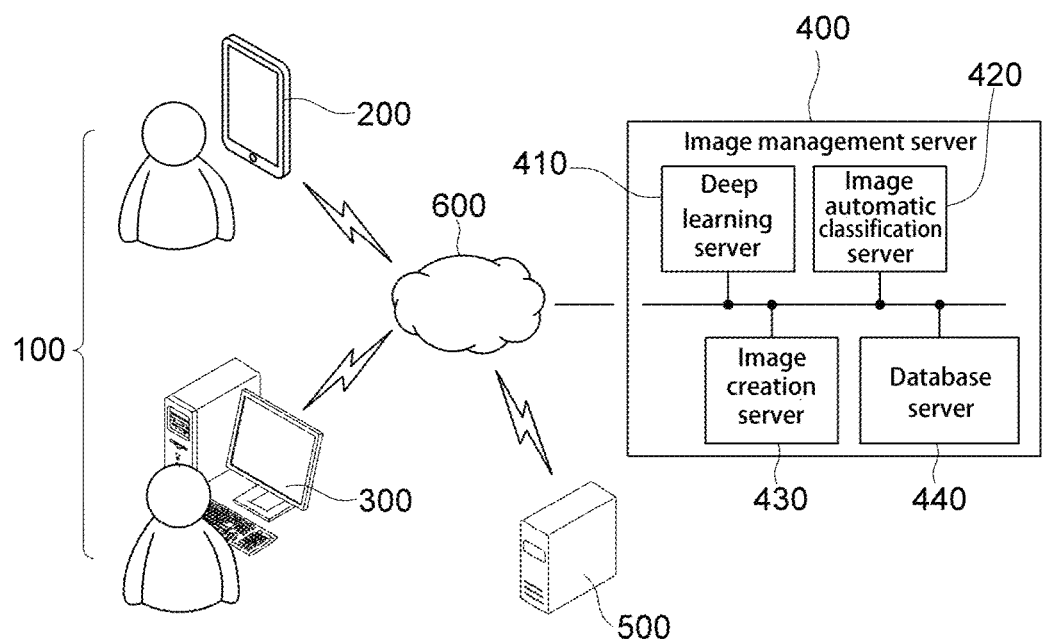

[FIG. 2]
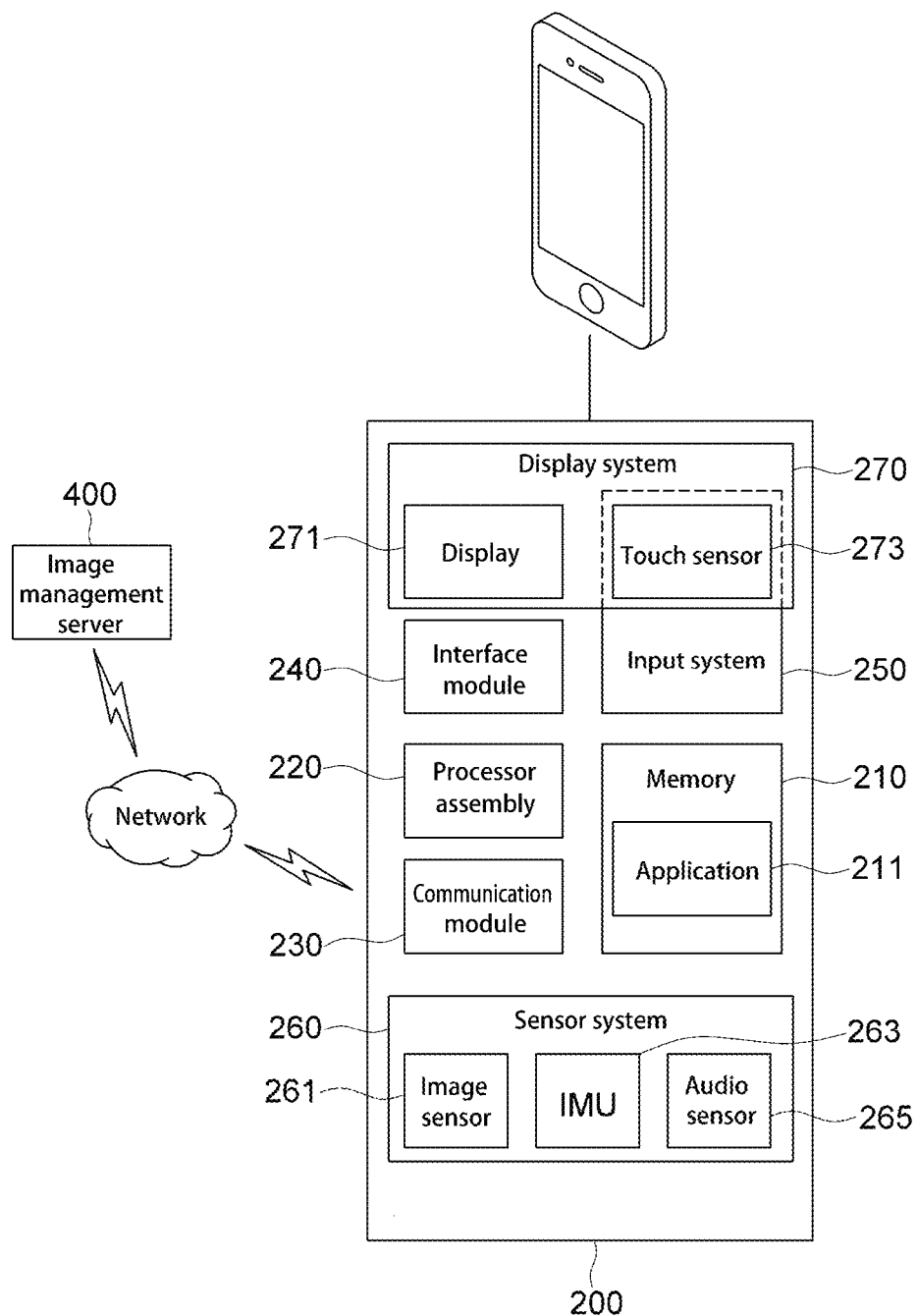

[FIG. 3]
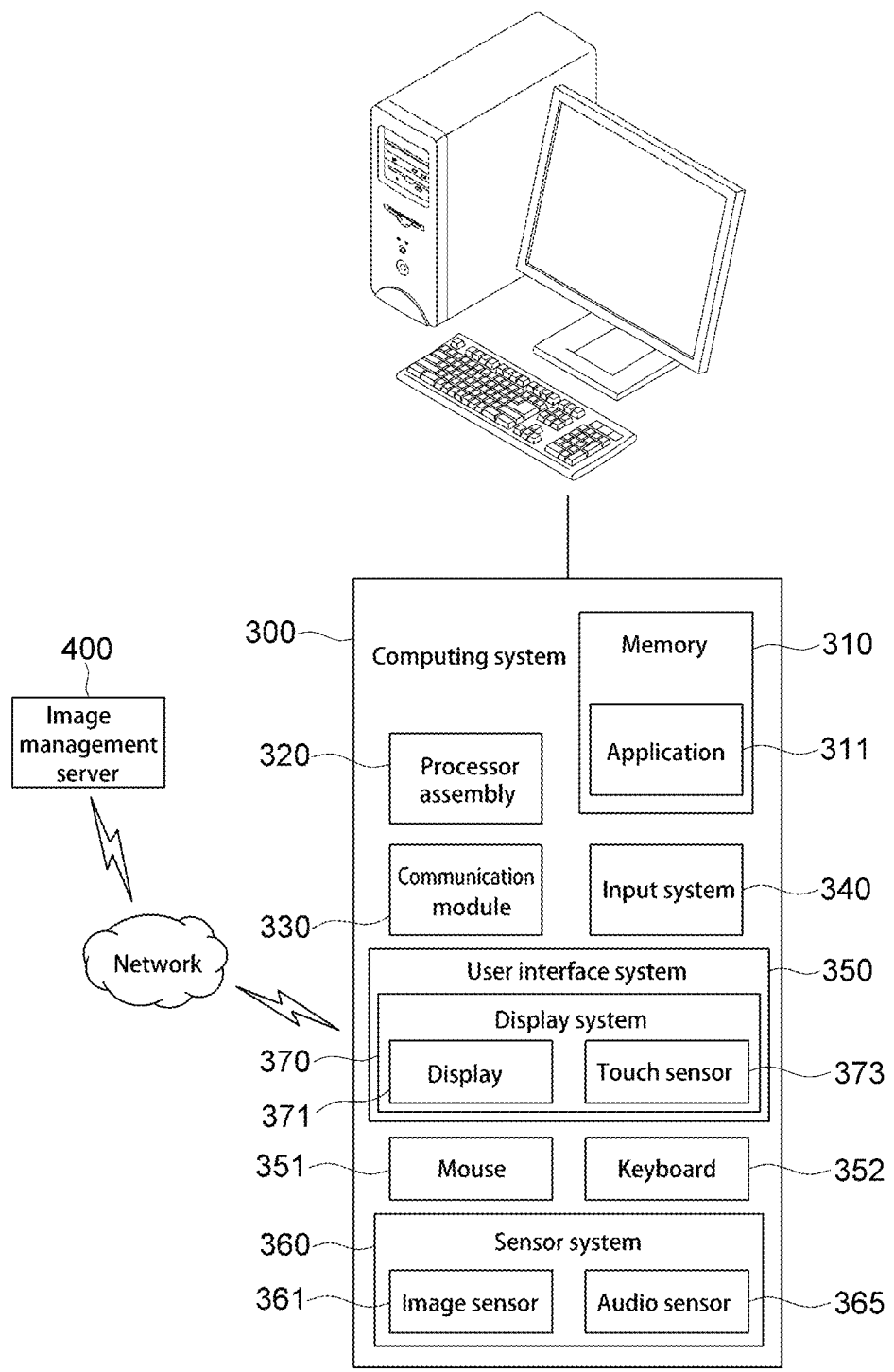

[FIG. 4]
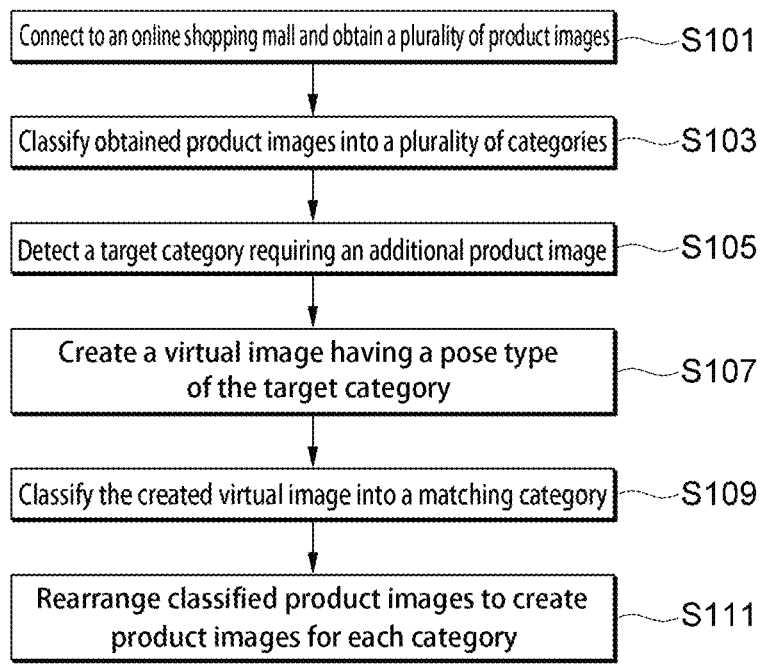
[FIG. 5]

[FIG. 6]
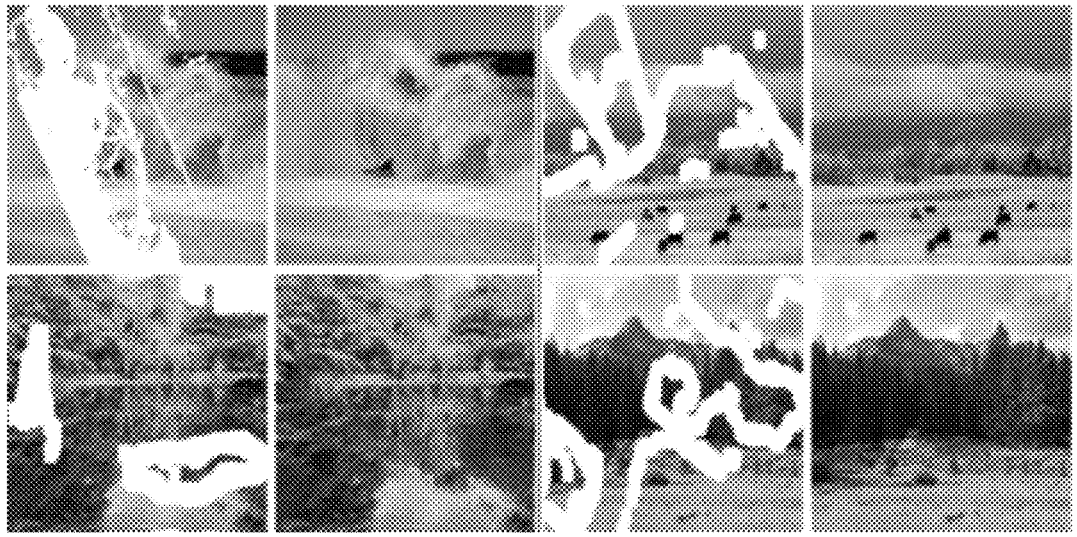
[FIG. 7]
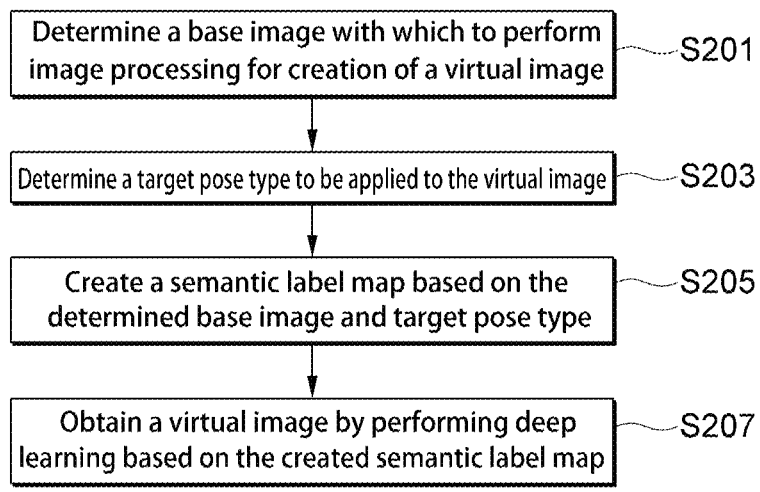

[FIG. 8]
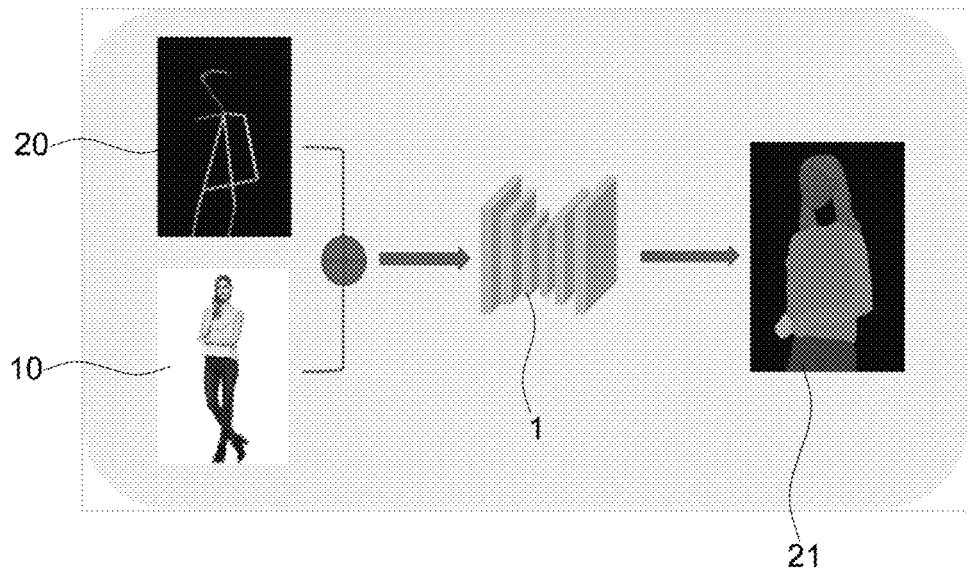
[FIG. 9]
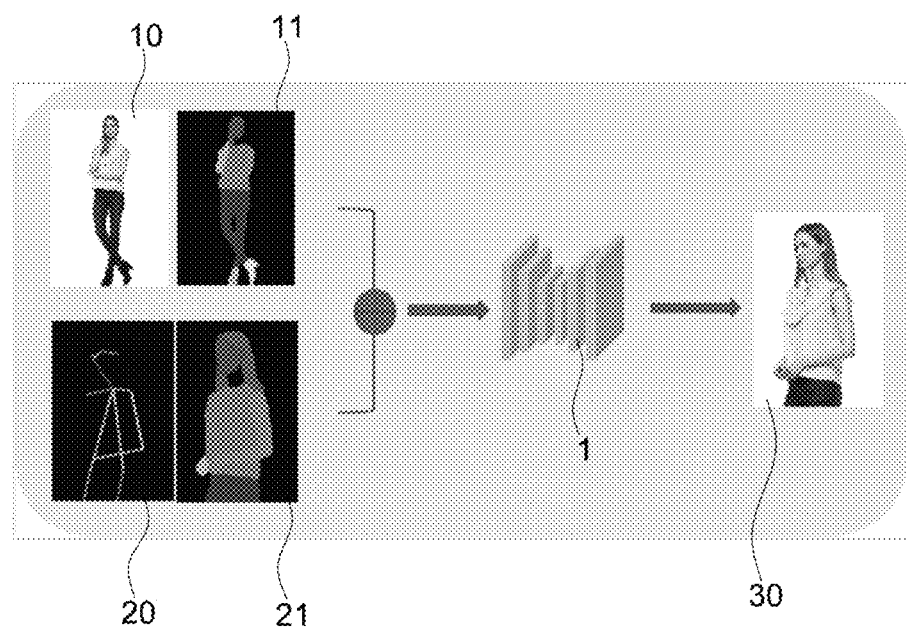

[FIG. 10]
| | Viewpoint shot | | | Rear shot |
| --- | --- | --- | --- | --- |
| | Full shot | | Close-up shot | |
| | Stand shot | Miscellaneous pose shot | | |
| First product | | | | |
| Second product | | | | |
| ⋮ | ⋮ | ⋮ | ⋮ | ⋮ |
[FIG. 11]
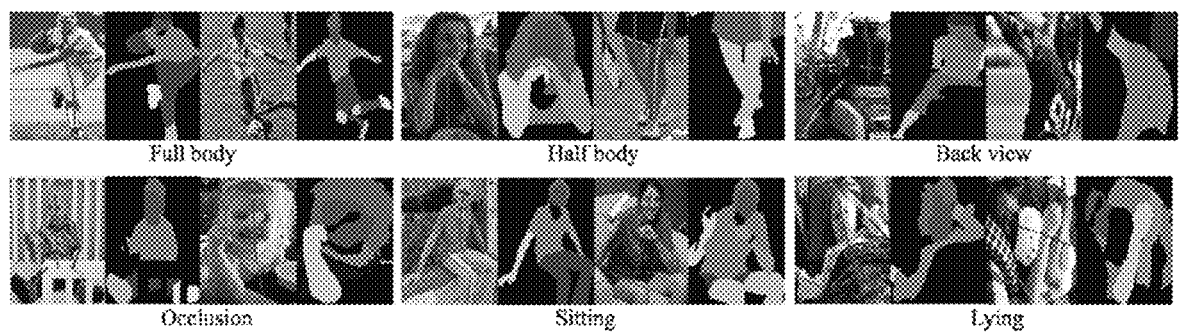

METHOD AND SYSTEM FOR CREATING VIRTUAL IMAGE BASED DEEP-LEARNING

CROSS REFERENCE TO RELATED APPLICATION

This application claims priority from and benefits of Korean Patent Application No. 10-2020-0049121, filed on Apr. 23, 2020, which is hereby incorporated by reference for all purposes as if fully set forth herein.

BACKGROUND OF THE DISCLOSURE

Field of the Disclosure

The present disclosure relates to a method for creating a virtual image based on deep-learning. More particularly, the present disclosure relates to a deep-learning based method for creating and providing an essential product image required when a plurality of product images are classified with respect to one product.

Related Art

As is well known, according to the increase of the Internet line speed and advances in multimedia technology, multimedia web information is being distributed widely through the Internet. According to the advances in security technology for distributing products over the Internet, transactions of products and various services mainly carried out offline are now being handled through online Internet shopping malls.

In other words, thanks to the advances in communication technology, it has become possible for a user to check product information provided by a shopping mall server and buy a desired product using the user's terminal.

At this time, for reasonable shopping, a user searches for and checks a plurality of images of the products provided by the shopping mall server.

However, various images found on an online shopping mall (for example, a picture of a model wearing a product, product texture, and/or a color image) are most often displayed randomly on a page dedicated to a product, and because of this, an inconvenience arises that the product is not recognized effectively.

Also, it is necessary to provide various images of a product provided by a shopping mall (for example, different poses of a model wearing a clothing product) to display the product more effectively. When there arises a need for another image in addition to the existing product images, a difficulty occurs that one has to carry out a separate photographing or retouching work to create the desired product image. In this regard, a method for solving the situation is needed.

Meanwhile, Artificial Intelligence (AI), based on a neural network that mimics the human brain, has evolved dramatically along with the advances of a deep learning technology that enables a computer to gather, analyze, and learn external data autonomously.

Therefore, nowadays, a computer is substituting humans for analyzing a vast amount of data and clustering or classifying objects or data.

Also, along with advances of an image deep-learning technology which applies a neural network to image processing, there is a growing interest in developing various methods employing image segmentation, image inpainting, and image composition.

Here, image segmentation refers to an image technique that partitions a whole image into object regions, which is intended to classify object regions from the whole image in pixel units.

Image inpainting refers to an image technique that restores an image region for an object missing from a whole image (namely, the region deleted from the image).

Finally, image composition refers to an image technique that creates a new image by synthesizing a plurality of images.

PRIOR ART REFERENCES

[Patents]
(Patent 1) 10-2016-0046471 A

SUMMARY

The present disclosure has been made to solve the problem above and intends to provide a method for creating a virtual image based on deep learning which classifies a plurality of product images with respect to one product provided on an online shopping mall in consideration of user convenience and creates product images required for the classification based on deep learning.

Technical objects to be achieved by the present disclosure and embodiments according to the present disclosure are not limited to the technical objects described above, and other technical objects may also be addressed.

A method and system for creating a virtual image based on deep learning according to an embodiment of the present disclosure enables an image application executed by a processor of a computer device to create a virtual image based on deep learning, which comprises obtaining a plurality of product images with respect to one product; classifying the obtained product images into a plurality of categories according to different pose types; determining a target category from among the plurality of categories for which the virtual image is to be created; creating a virtual image of a first pose type matched to the determined target category based on at least one product image among the plurality of product images; and displaying the created virtual image.

At this time, the determining a target category includes detecting an empty category to which the product image is not classified and determining the detected empty category as the target category.

Also, the virtual image is an image about the product created to have the first pose type by inputting the at least one product image and information on the first pose type to a pre-trained deep learning neural network.

Also, the creating a virtual image of the first pose type includes determining at least one of the plurality of product images as a base image.

Also, the determining a base image includes determining, as the base image, a product image belonging to the category of the highest priority according to preconfigured priorities for the respective categories.

Also, the creating a virtual image of the first pose type further includes creating a pose semantic label map of the first pose type by inputting the base image and information on the first pose type to a pre-trained deep learning neural network.

Also, the creating a virtual image of the first pose type further includes creating a base semantic label map which is a semantic label map of the base image.

Also, the creating a virtual image of the first pose type further includes creating, as an output, the virtual image by inputting the pose semantic label map and the base image to a pre-trained deep learning neural network.

Also, the creating a virtual image of the first pose type includes creating the virtual image as an output of the first pose type by inputting information on the first pose type and the pose semantic label map to a pre-trained deep learning neural network to correspond to the base image and the base semantic label map.

Also, a method and system for creating a virtual image based on deep learning according to an embodiment of the present disclosure comprises at least one processor; and a memory storing a memory storage command executed by the at least one processor, wherein the memory storage command includes a command for obtaining a plurality of product images with respect to one product, classifying the obtained product images into a plurality of categories according to different pose types, determining a target category from among the plurality of categories for which the virtual image is to be created, creating a virtual image of a first pose type matched to the determined target category based on at least one product image among the plurality of product images, and displaying the created virtual image.

Advantageous Effects

When a product image for one product is required in addition to existing product images, a method for creating a virtual image based on deep learning according to an embodiment of the present disclosure creates a required product image based on deep learning and provides the required product image that should be supplemented for an effective display of the product quickly and conveniently without separate photographing or retouching work.

Also, a method for creating a virtual image based on deep learning according to an embodiment of the present disclosure provides product images as seen from various viewpoints for more accurate recognition of the product on a shopping mall by providing a required product image based on deep learning, thereby improving the overall quality of the shopping mall service and enhancing user convenience at the same time.

Also, a method for creating a virtual image based on deep learning according to an embodiment of the present disclosure classifies a plurality of product images automatically with respect to one product in consideration of user convenience, thereby minimizing an inconvenience caused when product images are displayed randomly on a shopping mall, reducing costs consumed for constructing product pages, improving the usability of the shopping mall, and obtaining an effect of increasing sales.

The technical effects of the present disclosure are not limited to the technical effects described above, and other technical effects not mentioned herein may be understood clearly from the description below.

BRIEF DESCRIPTION OF THE DRAWINGS

FIG. 1 illustrates a system for creating an image based on deep learning according to an embodiment of the present disclosure.

FIG. 2 illustrates an internal block diagram of a mobile type computing device according to an embodiment of the present disclosure.

FIG. 3 illustrates an internal block diagram of a desktop type computing device according to an embodiment of the present disclosure.

FIG. 4 is a flow diagram illustrating a method for creating a virtual image based on deep learning according to an embodiment of the present disclosure.

FIG. 5 illustrates a segmentation technique based on image deep learning according to an embodiment of the present disclosure.

FIG. 6 illustrates an inpainting technique based on image deep learning according to an embodiment of the present disclosure.

FIG. 7 is a flow diagram illustrating a method for creating a virtual image according to an embodiment of the present disclosure.

FIGS. 8 and 9 illustrate a method for creating a virtual image according to an embodiment of the present disclosure.

FIG. 10 is an example illustrating product image information for each category according to an embodiment of the present disclosure.

FIG. 11 illustrates a semantic label map created based on a semantic label map generator according to an embodiment of the present disclosure.

DESCRIPTION OF EXEMPLARY EMBODIMENTS

FIG. 1 illustrates a system for creating an image based on deep learning according to an embodiment of the present disclosure.

Referring to FIG. 1, a system for creating an image based on deep learning according to an embodiment of the present disclosure may include a computing device 100, an image management server 400, a shopping mall server 500, and a network 600.

The computing device 100, the image management server 400, the shopping mall server 500, and the network 600 according to the embodiment may operate in conjunction with each other to classify a plurality of product images with respect to one project provided on an online shopping mall in consideration of user convenience and implement an image application capable of creating a product image required for the classification based on deep learning.

Also, the computing device 100, the image management server 400, the shopping mall server 500, and the network 600 according to the embodiment may provide a result created through the image application to a user on/offline.

More specifically, an image application according to an embodiment of the present disclosure may obtain a plurality of product images by connecting to an online shopping mall.

Here, the product image according to the embodiment may refer to an image of a product photographed for display including the corresponding product provided by an online shopping mall service.

Also, the image application may classify an obtained product image into one of a plurality of categories.

At this time, the category according to the embodiment may refer to a category to which a product image is classified based on a pose type of the corresponding product within the product image and/or product information. Detailed descriptions thereof will be given later.

Also, the image application according to the embodiment may detect a target category, which is a category deemed to require an additional product image among a plurality of categories.

Also, when a target category is detected, the image application may create a virtual image of a pose type matched to the target category based on a product image obtained by connecting to an online shopping mall.

Here, the virtual image according to the embodiment may refer to a product image having a new pose type created by performing deep learning image processing based on the existing product images.

A detailed description of a method for creating a virtual image according to an embodiment of the present disclosure will be given later when a method for creating a virtual image based on deep learning is described below.

Also, the image application creating a virtual image may classify a created virtual image into a matched category.

Also, the image application according to the embodiment may provide product image information for each category by rearranging classified product images including a created virtual image.

Here, product image information for each category may refer to the information provided by classifying and rearranging various product images displayed randomly on an online shopping mall in consideration of user convenience.

At this time, the image application according to the embodiment may provide the product image information for each category to the user online or offline.

Meanwhile, the computing device 100, the image management server 400, and the shopping mall server 500 of FIG. 1 may be connected through the network 600.

Here, the network 600 refers to a connection structure enabling exchange of information between individual nodes, such as the computing device 100, the image management server 400, and the shopping mall server 500, where examples of the network 600 include a 3rd Generation Partnership Project (3GPP) network, a Long Term Evolution (LTE) network, a World Interoperability for Microwave Access (WIMAX) network, Internet, a Local Area Network (LAN), a Wireless Local Area Network (WLAN), a Wide Area Network (WAN), a Personal Area Network (PAN), a Bluetooth network, a satellite broadcast network, an analog broadcast network, and a Digital Multimedia Broadcasting (DMB) network but are not limited to the above.

Computing Device

A computing device 100 according to an embodiment of the present disclosure may provide an environment for using an online shopping mall service, classify a plurality of product images with respect to one product within the online shopping mall service environment, and execute an image application capable of creating a product image required for the classification based on deep learning.

Also, the computing device 100 according to the embodiment may display product image information created for each category and provide an interface through which a user may utilize the displayed product image information for each category.

According to the embodiment, the computing device 100 may include various types of computing devices 100 (for example, a mobile type or desktop type computing device) in which an image application is installed.

1. Mobile Type Computing Device

A mobile type computing device 200 according to an embodiment of the present disclosure may be a mobile device such as a smart phone or a tablet PC in which an image application is installed.

For example, examples of the mobile type computing device 200 may include a smart phone, a mobile phone, a digital broadcast terminal, a Personal Digital Assistant (PDA), a Portable Multimedia Player (PMP), and a tablet PC.

FIG. 2 illustrates an internal block diagram of a mobile-type computing device according to an embodiment of the present disclosure.

Referring to FIG. 2, a mobile type computing device 200 according to an exemplary implementation may include a memory 210, a processor assembly 220, a communication module 230, an interface module 240, an input system 250, a sensor system 260, and a display system 270. These constituting elements may be arranged to be included within a housing of the mobile type computing device 200.

More specifically, the memory 210 may store an image application 211, wherein the image application 211 may store at least one or more of various application programs, data, and commands for providing an environment for implementing a deep learning-based image creation service.

For example, the memory 210 may include product image information, product information, category information, virtual image information, pose type information, and/or product image information for each category.

In other words, the memory 210 may store commands and data which may be used to create a deep learning-based image creation service environment.

Also, the memory 210 may include at least one or more non-volatile computer-readable storage media and volatile computer-readable storage media. For example, the memory 210 may include various storage devices such as a ROM, an EPROM, a flash drive, and hard drive; and a web storage performing a storage function of the memory 210 on the Internet.

The processor assembly 220 may include at least one or more processors capable of executing commands of the image application 211 stored in the memory 210 to perform various tasks for implementing a deep learning-based image creation service environment.

The processor assembly 220 according to the embodiment may control the overall operation of constituting elements through the image application 211 of the memory 210 to provide a deep learning-based image creation service.

The processor assembly 220 may include a Central Processing Unit (CPU) and/or a Graphic Processing Unit (GPU). Also, the processor assembly 220 may be implemented by including at least one of Application Specific Integrated Circuits (ASICs), Digital Signal Processors (DSPs), Digital Signal Processing Devices (DSPDs), Programmable Logic Devices (PLDs), Field Programmable Gate Arrays (FPGAs), controllers, micro-controllers, microprocessors, and electric units for performing miscellaneous functions.

The communication module 230 may include one or more devices for communicating with other computing devices (for example, the image management server 400). The communication module 230 may perform communication through a wireless network.

More specifically, the communication module 230 may communicate with a computing device storing a content source for implementing a deep learning-based image creation service environment and communicate with various user input components such as a controller receiving user inputs.

The communication module 230 according to the embodiment may transmit and receive various types of data related to a deep learning-based image creation service to and from the image management server 400, the shopping mall server 500, and/or another computing device 100.

The communication module 230 may transmit and receive data wirelessly to and from at least one of a base station, an external terminal, and a particular server on a mobile communication network constructed through a communication apparatus compliant with technology standards or communication methods for mobile communication (for example, Long Term Evolution (LTE), Long Term Evolution-Advanced (LTE-A), 5G New Radio (NR), or WIFI) or short distance communication methods.

The sensor system 260 may include various sensors such as an image sensor 261, a position sensor (IMU, 263), an audio sensor, a distance sensor, a proximity sensor, and a touch sensor.

The image sensor 261 may capture an image and/or a picture of a physical space in the surroundings of the motile type computing device 200.

The image sensor 261 according to the embodiment may capture an image (for example, QR code) related to a deep learning-based image creation service.

Also, the image sensor 261 may be disposed on the front surface and/or rear surface of the mobile type computing device 200 to obtain an image of the surroundings along the disposed direction and capture a physical space through a camera disposed toward the outside of the mobile type computing device 200.

The image sensor 261 may include an image sensor device and an image processing module. More specifically, the image sensor 261 may process a still image or a video obtained by the image sensor device (for example, CMOS or CCD).

Also, the image sensor 261 may extract required information by processing a still image or a video obtained through the image sensor device using an image processing module and forward the extracted information to the processor.

The image sensor 261 may be a camera assembly including at least one or more cameras. The camera assembly may include an ordinary camera taking a photograph in the visible light band and may further include a special camera such as an infrared camera or a stereo camera.

The IMU 263 may detect at least one or more of a motion and an acceleration of the mobile type computing device 200. For example, the IMU 263 may be made of a combination of various position sensors such as an accelerometer, a gyroscope, and a magnetometer. Also, in conjunction with a positioning module such as GPS of the communication module 230, the IMU 263 may recognize spatial information about the physical space in the surroundings of the mobile type computing device 200.

Also, the IMU 263 may extract information related to the detection and tracking of an eye gaze direction and a user's head motion based on the detected position and orientation.

Also, in some implementations, the image application 211 may determine the user's position and orientation within a physical space or recognize features or objects within the physical space by using the IMU 263 and the image sensor 261.

The audio sensor 265 may recognize a sound in the surroundings of the mobile type computing device 200.

More specifically, the audio sensor 265 may include a microphone capable of sensing a voice input of a user of the mobile type computing device 200.

The audio sensor 265 according to the embodiment may receive, from the user, voice data required for a deep learning-based image creation service.

The interface module 240 may connect the mobile type computing device 200 to one or more different devices for communication. More specifically, the interface module 240 may include a wired and/or wireless communication device compliant with one or more different communication protocols.

The mobile type computing device 200 may be connected to various input-output devices through the interface module 240.

For example, the interface module 240, being connected to an audio output device such as a headset port or a speaker, may output an audio signal.

The present embodiment assumes that the audio output device is connected through the interface module 240, but a different embodiment in which the audio output device is installed inside the mobile type computing device 200 may also be implemented.

The interface module 240 may be composed of at least one of a wired/wireless headset port, an external charging port, a wired/wireless data port, a memory card port, a port connecting to a device equipped with an identification module, an audio Input/Output (I/O) port, a video I/O port, an earphone port, a power amplifier, an RF circuit, a transceiver, and other communication circuits.

The input system 250 may sense a user input (for example, a gesture, a voice command, a button operation, or other input types) related to a deep learning-based image creation service.

More specifically, the input system 250 may include an image sensor 261 receiving a button input, a touch sensor input, and a user motion input.

Also, the input system 250, being connected to an external controller through the interface module 240, may receive a user's input.

The display system 270 may output various pieces of information related to a deep learning-based image creation service as a graphic image.

The display system 270 may include at least one of a Liquid Crystal Display (LCD), a Thin Film Transistor-Liquid Crystal Display (TFT LCD), an Organic Light-Emitting Diode (OLED) display, a flexible display, a 3D display, and an e-ink display.

The constituting elements may be disposed within a housing of the mobile type computing device 200, and a user interface may include a touch sensor 273 on a display 271 configured to receive a user's touch input.

More specifically, the display system 270 may include the display 271 and the touch sensor 273 sensing a touch input of the user.

The present embodiment assumes that the display 271 may be implemented as a touch screen by forming a layered structure or being integrated with the touch sensor 273. The touch screen may not only function as a user input unit providing an input interface between the mobile type computing device 200 and the user but also provide an output interface between the mobile type computing device 200 and the user.

2. Desktop Type Computing Device

FIG. 3 illustrates an internal block diagram of a desktop type computing device according to an embodiment of the present disclosure.

In describing the constituting elements of the desktop type computing device 300, repeated descriptions are substituted by the descriptions of the corresponding constituting elements of the mobile type computing device 200; in what follows, descriptions are given mainly to the difference from the mobile type computing device 200.

Referring to FIG. 3, the desktop type computing device according to another embodiment may further include a device equipped with a program for executing a deep learning-based image creation service based on wired/wireless communication, such as a fixed desktop PC, a laptop computer, or a ultrabook in which an image application 311 is installed.

Also, the desktop type computing device 300 may receive a user input (for example, a touch input, a mouse input, a keyboard input, a gesture input, and a motion input using a guide tool) using a user interface system 350.

The desktop type computing device 300 according to an embodiment may obtain a user input by connecting the user interface system 350 to at least one device such as a mouse 351, a keyboard 352, a gesture input controller, an image sensor 361 (for example, a camera), and an audio sensor 365 via various communication protocols.

Also, the desktop type computing device 300 may be connected to an external output device through the user interface system 350, for example, a display device 370 or an audio output device.

Also, the desktop type computing device 300 according to the embodiment may include a memory 310, a processor assembly 320, a communication module 330, a user interface system 350, and an input system 340. These constituting elements may be configured to be included within a housing of the computing device 300.

Descriptions of the constituting elements of the desktop type computing device 300 are substituted by the descriptions given to the constituting elements of the mobile type computing device 200.

Since the constituting elements of FIGS. 2 and 3 according to the present embodiment are not essential to implement the computing device 100, the computing device 100 according to the present disclosure may have a greater or fewer number of constituting elements than listed above.

Image Management Server

Meanwhile, an image management server 400 according to an embodiment of the present disclosure may perform a series of processes to provide a deep learning-based image creation service.

More specifically, the image management server 400 may perform image deep learning based on product images for a product provided on an online shopping mall.

Also, the image management server 400 may automatically classify a plurality of product images with respect to one product into the respective categories based on image deep learning.

Also, the image management server 400 according to the embodiment may create a product image required for classifying a plurality of product images with respect to one product based on image deep learning.

Also, the image management server 400 may store one or more of various application programs, data, and commands for implementing a deep learning-based image creation service.

More specifically, referring to FIG. 1, the image management sever 400 may include a deep learning server 410, an image automatic classification server 420, an image creation server 430, and a database server 440. At this time, depending on embodiments, the respective constituting elements may be implemented by separate devices different from the image management server 400 or may be implemented inside the image management server 400. In what follows, it is assumed that each constituting element is included in the image management server 400, but the present disclosure is not limited to the assumption.

More specifically, the deep learning server 410 may operate in conjunction with an image deep learning neural network.

Here, the image deep learning neural network may include at least one of a Convolution Neural Network (CNN), for example, a U-net CNN, and a Mask R-CNN.

The deep learning server 410 operating in conjunction with an image deep learning neural network may implement image processing techniques such as image segmentation, inpainting, and/or composition. Detailed descriptions thereof will be given later.

The deep learning server 410 according to the embodiment may output product information, pose type, and/or a virtual image based on the product image through image deep learning and provide the output information to a computing device and/or another server (for example, the image automatic classification server 420 and/or the image creation server 430).

Also, the image automatic classification server 420 may automatically classify various product images on an online shopping mall to meet the user's convenience in conjunction with the deep learning server 410.

In addition, the image automatic classification server 420 may create product image information for each category that is rearranged so that the user may quickly identify and check the automatically classified product on a shopping mall.

Also, the image creation server 430 may perform image deep learning processing based on the existing product images in conjunction with the deep learning server 410 to create a virtual image that is a product image having a new pose type different from the existing product images.

The image creation server 430 according to the embodiment may include a semantic label map generator.

Here, the semantic label map generator may be a map image creation module that divides a region of an input image into a region including a body part of a subject (a model and/or a mannequin) and a product; and the remaining region.

Referring to FIG. 11, the semantic label map generator according to the embodiment may be a module creating a map image dividing a region of an input image into a plurality of regions consisting of a region including a body region (for example, a face region (including an eye region, a nose region, an ear region, and/or a neck region), a shoulder region, an elbow region, a wrist region, a hip region, a knee region, and/or an ankle region) and a product region; and the remaining region.

Also, the image creation server 430 may classify a created virtual image into a category matched to the virtual image by providing the created virtual image into a computing device and/or another server (for example, the image automatic classification server 420).

Also, the database server 440 may store and manage various application programs, applications, commands, and/or data for implementing a deep learning-based image creation service.

The database server 440 according to the embodiment may store and manage product image information, product information, category information, virtual image information, pose type information, and/or product image information for each category.

Meanwhile, the image management server 400 including the constituting elements above may be composed of at least one or more of the deep learning server 410, the image automatic classification server 420, the image creation server 430, and/or the database server 440; and may include processors for data processing and memories for storing commands for providing a deep learning-based image creation service.

Also, according to the embodiment of the present disclosure, the image management server 400 performs image deep-learning based on product images of a product provided on an online shopping mall, automatically classifies a plurality of product images with respect to one product into the respective categories based on image deep-learning, creates a product image required for classification of a plurality of product images with respect to one product based on image deep-learning, and stores at least one or more of various application programs, data, and commands for implementing a deep learning-based image creation service; however, depending on embodiments, a computing device may perform part of the functional operations performed by the image management server 400, and it should be clearly understood that various other embodiments may be implemented.

Shopping Mall Server

Also, a shopping mall server 500 according to an embodiment of the present disclosure may perform a series of processes for providing an online shopping mall service.

More specifically, the shopping mall server 500 according to the embodiment may provide the computing device 100 with an environment for providing an e-commerce online shopping mall service in which a user may order or sell a product through the network 600.

Also, the shopping mall server 500 may transmit and receive various types of data required for a deep learning-based image creation service.

The shopping mall server 500 according to the embodiment may transmit a plurality of product images on an online shopping mall to the computing device 100 and/or the image management server 400; or receive product image information created for each category from the computing device 100 and/or the image management server 400.

Also, the shopping mall server 500 may store at least one or more of application programs, data, and commands required for functional operations related to an online shopping mall service.

The shopping mall server 500 according to the embodiment may store and mange product images and/or product information on an online shopping mall.

More specifically, the shopping mall server 500 may include a shopping mall service providing server, a product management server, and a data storage server.

Here, the shopping mall service providing server may provide an environment that enables an online shopping mall service to operate on a computing device.

In other words, the shopping mall service providing server may provide an environment for implementing an online shopping mall service providing an online shopping mall which is a virtual shop where a product may be bought or sold on the Internet using a computing device.

The shopping mall service providing server according to the embodiment may include various application programs, data, and/or commands capable of implementing a service provided in conjunction with an online shopping mall service.

Also, a product management server may perform a management function for at least one or more products provided based on an online shopping mall service.

The product management server according to the embodiment may manage a product name, a product image, a product price, and/or remaining quantities of the product.

Also, the data storage server may store and manage various application programs, applications, commands, and/or data for implementing an online shopping mall service.

For example, the data storage server may store and manage personal information, shopping information, and/or order information for each user who uses an online shopping mall service by matching the information to the corresponding user account.

The shopping mall server 500 including the constituting elements above may be composed of at least one or more of the shopping mall service providing server, the product management server, and/or a data storage server; and may include processors for data processing and memories for storing commands for providing an online shopping mall service.

Method for Creating a Virtual Image Based on Deep Learning

In what follows, a method for creating a virtual image based on deep learning according to an embodiment of the present disclosure will be described in detail with reference to appended drawings.

FIG. 4 is a flow diagram illustrating a method for creating a virtual image based on deep learning according to an embodiment of the present disclosure.

Referring to FIG. 4, a computing device 100 according to an embodiment of the present disclosure may classify a plurality of product images in consideration of user convenience and execute an image application capable of creating a product image required for the classification based on deep learning.

And the image application executed by a processor of the computing device 100 may obtain a plurality of product images by connecting to an online shopping mall S101.

More specifically, the image application may connect to the online shopping mall based on an online shopping mall service provided by the shopping mall server 500.

Also, the image application may receive and obtain a plurality of product images from the connected online shopping mall.

For example, the image application may automatically obtain a plurality of product images with respect to one product by crawling the plurality of product images included in a sales page with respect to one product of the connected online shopping mall.

Here, the product image according to the embodiment may be an image including a product, photographed for displaying the corresponding product provided by an online shopping mall service.

The image application according to the embodiment may further classify the product image for each category in conjunction with the image automatic classification server 420.

More specifically, the image application may determine the category to which a product image belongs sequentially according to criteria for categorization.

For example, the image application may first classify a product image into one of a product and pose shot categories.

Also, the image application may then classify the classified pose shot into a first category composed of a rear shot and a viewpoint shot, after which the classified viewpoint shot may be classified into a secondary category composed of a close-up shot and a full shot.

Also, the image application may classify the classified full shot into a stand shot and a miscellaneous pose shot, and the miscellaneous pose shot may be further classified into a side shot, a sitting shot, or a lie shot. Detailed descriptions thereof will be given later.

In what follows, the embodiment assumes that the image application obtains a plurality of product images with respect to one product and performs a series of processes to be described later, but the present disclosure is not limited to the assumption above.

Also, in the following embodiments, it is assumed that the image application performs an operation to be described, based on a pose shot showing a product worn by a model or a mannequin among a plurality of product images, but the present disclosure is not limited to the assumption.

Returning again, the image application according to the embodiment may also obtain product information for each product image based on the obtained product image.

Here, product information may be the information on an attribute category to which each product belongs, such as a top, bottoms, and/or a dress.

More specifically, the image application according to the embodiment may perform deep learning for each product image through a deep learning neural network trained using image-based product groups (for example, a top, bottoms, and/or a dress) in conjunction with the deep learning server 410 of the image management server 400 and obtain product information for each product image as an output through the deep learning neural network.

Also, the image application may classify the obtained product images into a plurality of categories S103.

More specifically, the image application, in conjunction with the image automatic classification server 420 of the image management server 400, may classify each of the plurality of product images into the corresponding category among a plurality of shot categories.

Here, the category according to the embodiment of the present disclosure may refer to a category to which a product image is classified based on a pose type related to a product within the product image and/or product information.

Here, the pose type according to the embodiment may refer to a particular pose type taken by a subject of the product image such as a full shot or a rear shot, which may correspond to coordinate information on a body key-point of the subject (a model or a mannequin) within the product image.

The pose type according to the embodiment may include coordinate information on body key-points including a face region (including an eye region, a nose region, an ear region, and/or a neck region), a shoulder region, an elbow region, a wrist region, a hip region, a knee region, and/or an ankle region of a subject within a product image.

For example, the image application may first classify a product image into a product shot category or a pose shot category based on whether a model's pose type is detected from the product image.

Then, the image application may further classify a product image that falls under the pose shot category into a pose type category.

More specifically, the image application according to the embodiment may perform deep learning based on product images in conjunction with the image automatic classification server 420 and classify a product image into one of a rear shot, close-up shot, stand shot, and/or miscellaneous pose shot categories through a deep learning neural network.

The image application according to the embodiment may use a pose type within the product image as a criterion to classify a plurality of product images obtained (in the embodiment, a plurality of pose shots).

At this time, the image application may classify a product image into at least one category of a pose image showing the rear view of the product (hereinafter, a rear shot), a pose image showing the front view of the product (hereinafter, a viewpoint shot), a pose image showing a close-up of the product (hereinafter, a close-up shot), a pose image showing a full body of a subject (a human or a mannequin) wearing the product (hereinafter, a full shot), a pose image in which the subject is standing (hereinafter, a stand shot), and/or a miscellaneous pose image (hereinafter, a miscellaneous pose shot) according to the pose type through a deep learning neural network.

Here, to determine the pose type of a pose shot, the image application may use a pose shot recognizer algorithm among image deep learning techniques.

At this time, the pose shot recognizer is an algorithm that determines a pose type of a subject (a human or a mannequin) in a product image based on a rule and/or deep learning, which determines a pose type according to a preconfigured rule and/or criterion. The pose shot recognizer algorithm is implemented using a neural network trained through deep learning, which may be a pose detector neural network detecting a pose type by considering the pose type as an object.

More specifically, the pose shot recognizer may classify the product image based on whether the product image corresponds to at least one of 1) the rear shot, 2) the full shot, and 3) stand shot.

More specifically, the pose shot recognizer may classify a product image by applying a rear shot, full shot, and stand shot criteria sequentially to the product image, where the pose shot recognizer first determines rear shots based on the rear shot criterion.

The pose shot recognizer may then determine full shots by applying the full shot criterion to the remaining product images that are not a rear shot.

Next, the pose shot recognizer may apply the stand shot criterion to the full shots to classify product images into stand shots and miscellaneous pose shots.

For example, when a first product image is determined to fall under the viewpoint shot, the full shot, and the stand shot, the image application may classify the first product image as a stand shot.

Also, when a second product image is determined to fall under the viewpoint shot and the full shot but not the stand shot, the image application may classify the second product image as a miscellaneous pose shot.

As described above, the image application may improve not only the speed but also the accuracy of image deep learning for product images by performing image classification based on pose types within the product images in the order described above.

The description above assumed that the image application classifies the respective product images into a plurality of categories in conjunction with the image management server 400. However, in various other embodiments, the image application may obtain a pose type for each product image and classify the product images according to a plurality of categories without involving an external server.

As described above, the image application according to the embodiment of the present disclosure may reduce the cost for constructing a product page, improve the usability of a shopping mall, and accordingly, increase the sales amount by automatically classifying various product images displayed randomly on an online shopping mall in a form optimized for the convenience of shopping mall users (for example, classification of product images so that the product images are displayed in a format suitable for a mobile version online shopping mall when the images of a PC version online shopping mall are displayed on the mobile computing device 200).

Also, the image application according to the embodiment of the present disclosure may set part of a plurality of categories for classification of a product image as required categories.

Here, the required category according to the embodiment may be a category to which a product image having a particular pose type predetermined to be necessary for an effective display of the product belongs.

In other words, the image application may determine at least one of a plurality of categories that classify a product image according to the pose type within the corresponding product image as the required category.

At this time, the image application may preconfigure the required category manually according to the user input or automatically according to a predetermined criterion.

For example, the image application may collect categories selected as the required category according to the user input more than a predetermined number of times for each product information and derive important categories with a high degree of importance for each product information based on the collected information. And the image application may automatically set the required category according to the product information of the first product image based on the derived important category for each product information.

For example, when the product information of a first product represents a 'dress' and the important categories matching the dress product information are the rear shot, close-up shot, and stand shot categories, the image application may determine the rear shot, close-up shot, and stand shot categories as the required category for the first product.

As described above, the image application according to the embodiment of the present disclosure may configure a required category for each product, thereby selecting and providing a product image optimized for displaying the product provided by a shopping mall more clearly and reliably.

Also, the image application according to the embodiment may detect a target category that requires additional product images S105.

More specifically, the image application may detect a target category requiring an additional product image among at least one or more required categories with respect to one product.

The image application according to the embodiment may detect an empty required category to which no product image has been classified among a plurality of required categories and determine the detected empty required category as a target category.

In other words, the image application may automatically detect an empty required category that has been preconfigured for classifying a product image having a required pose type with respect to one product but is empty because no product image of the corresponding pose type exists and determine the detected category as a target category.

For example, when the required categories preconfigured for a first product are the rear shot, close-up shot, and stand shot categories; and a plurality of product images obtained from the first product are classified into the rear shot and close-up shot categories, respectively, the image application may automatically detect the stand shot category which is an empty required category to which no product image of the first product is classified and determine the detected stand shot category as a target category.

In another embodiment, the image application may determine a target category based on the quality of a product image classified to the required category.

In other words, the image application may determine the target category according to whether a classified product image satisfies a predetermined quality criterion (for example, whether the pose type within the product image satisfies the category pose type) although the product image falls under the required category.

In yet another embodiment, the image application may determine a target category based on the selection according to the user input.

More specifically, the image application may provide a user interface through which a category requiring an additional product image is selected.

Then, the image application may determine the target category according to the user input received through the provided interface.

As described above, the image application according to the embodiment may supplement an image required for a high-quality display of a product by determining the case where there is no product image regarded as being required for displaying the product on a shopping mall in a more effective manner using various methods.

Furthermore, when the target category is detected, the image application according to the embodiment of the present disclosure may create a virtual image having a pose type matched to the target category based on the product images S107.

Here, the virtual image according to the embodiment may refer to a product image created to have a new pose by applying deep learning image processing based on the existing product images.

More specifically, the image application according to the embodiment may create a virtual image by performing image deep learning based on product images in conjunction with the image management server 400.

At this time, the image application may create a virtual image using image processing techniques including image segmentation, image inpainting, and/or image composition.

Referring to FIG. 5, image segmentation may refer to a technique for extracting object regions from the whole image and may refer to a technique for partitioning the whole image into object regions in pixel units.

Also, referring to FIG. 6, image inpainting refers to an image technique that restores an image region for an object missing from a whole image (namely, the region deleted from the image).

Also, image composition according to the embodiment may refer to a technique that implements a new image by composing images created through image segmentation and/or inpainting.

Returning again, when the stand shot category is detected as a target category for the first product, the image application may create a stand shot image for the first product having a pose type matched to the stand shot category which is the detected target category as a virtual image through image deep learning based on the product images of the first product.

The embodiment of the present disclosure assumes that the image application creates a virtual image having a pose type matched to a target category based on product images in conjunction with the image management server 400; however, in various other embodiments, the image application may create a virtual image based on the product images without involving an external server.

As described above, the image application may provide an image that should be supplemented to display a product provided by a shopping mall in an effective manner by creating the image based on deep learning using product images of the corresponding product, thereby supplementing a product display by creating a new product image quickly and conveniently without a separate photographing or retouching work to create the additionally required product image.

In what follows, a method for creating a virtual image having a pose type matched to a target category by the image application based on product images will be described in more detail with reference to appended drawings.

FIG. 7 is a flow diagram illustrating a method for creating a virtual image according to an embodiment of the present disclosure, and FIGS. 8 and 9 illustrate a method for creating a virtual image according to an embodiment of the present disclosure.

Referring to FIGS. 7 and 8, the image application according to an embodiment may determine a base image 10 among a plurality of product images, on which image processing is performed to create a virtual image S201.

More specifically, the image application may select a product image having a relatively maximum amount of information on the corresponding product and model among a plurality of product images as the base image 10.

More specifically, the image application according to the embodiment may determine a product image having a relatively maximum amount of information on the corresponding product and model according to a preconfigured priority and select a base image 10 from the determination.

Here, the image application may automatically set a base image 10 based on the data trained through repeated execution of a deep learning-based virtual image creation process.

More specifically, as a base image 10, the image application may select the product image displaying the most of a plurality of body key-points of a model.

Also, the image application may set the priority for selecting a base image 10 based on a user input. For example, the image application may determine the base image 10 in the priority order of "stand shot, miscellaneous pose shot, close-up shot, and rear shot".

More specifically, when a plurality of product images with respect to a first product include the stand shot, the close-up shot, and the rear shot, the image application may determine the stand shot image as a base image 10 to be used for creating a virtual image of the first product according to the priority.

And when a plurality of product images with respect to the first product do not have a miscellaneous pose shot and the miscellaneous pose shot category is detected as a target category, a miscellaneous pose shot for the first product may be created using a virtual image through image deep learning based on the stand shot image determined as the base image 10.

Also, when a plurality of product images belong to a high priority category, the image application according to the embodiment may determine the base image 10 by detecting an image containing the most information on the corresponding model and/or product among a plurality of product images of the high priority category.

The image application according to the embodiment may set a predetermined criterion based on the data learned through repeated execution of a virtual image creation process based on a user input and/or deep learning; and detect the image containing the most information on the corresponding product among a plurality of product images belonging to the high priority category based on the predetermined criterion and determine the detected image as the base image 10.

For example, when the high priority category of the first product is a viewpoint shot category and includes a plurality of viewpoint shot images, the image application may determine whether each viewpoint shot image includes the full body of a subject (a human or a mannequin) according to a predetermined criterion.

More specifically, that a viewpoint shot includes the full body means that the shot image contains the most of a plurality of body key-points. For example, when a model in an image is partitioned into segments, the image containing the most of body key-points classified into head, chest, torso, left arm, right arm, right leg, left leg, left foot, and right foot may be determined as a base image 10.

The image application may determine, according to whether an image among the plurality of viewpoint shot images contains the full body of a subject, that the larger the area occupied by the body within the image, the more information on the first product the image provides; and select the base image 10 from the determination.

In another example, when the high priority category for the first product is a viewpoint shot category and includes a plurality of viewpoint shot images, the image application may set the front angle level (a value indicating the degree of closeness to the front viewpoint) of a viewpoint to a subject and/or a product within each viewpoint shot image as a predetermined criterion.

Meanwhile, based on the front angle level, the image application may determine that the closer an image among the plurality of viewpoint shot images to the front viewpoint, the more information on the first product the image provides and select the base image 10 through the determination.

As described above, when a virtual image is created with respect to one product, the image application according to the embodiment of the present disclosure may create a virtual image based on the product image having the most information on the product, thereby improving accuracy and quality of the created virtual image.

Also, the image application according to the embodiment may determine a target pose type 20 to be applied to a virtual image S203.

Here, the target pose type 20 according to the embodiment may be coordinate information on the pose type to be applied to a virtual image, namely, the body key-point of a subject (a model or a mannequin) within the virtual image.

The target pose type 20 according to the embodiment may include coordinate information on body key-points including a face region (including an eye region, a nose region, an ear region, and/or a neck region), a shoulder region, an elbow region, a wrist region, a hip region, a knee region, and/or an ankle region of a subject within a product image.

The target pose type 20 may be rendered to an image based on the information included therein.

More specifically, the coordinate information for each body key-point included in the target pose type 20 according to the embodiment may be rendered to a graphic image by the computing device 100 and/or the image management server 400.

For example, the target pose type 20 may be rendered to a graphic image in a way that the coordinate information of a face region, a shoulder region, an elbow region, a wrist region, a hip region, a knee region, and/or a ankle region is displayed according to a predetermined way (for example, using a solid line for indicating each coordinate).

At this time, the target pose type 20 rendered to an image may be displayed in a shape different from each other so that each information may be distinguished easily.

The target pose type 20 rendered to an image may be displayed so that each coordinate information is indicated using a shape different from each other; for example, a solid pink line indicates the coordinate information on the face region, a solid red line indicates the coordinate information on the right shoulder region, and a solid orange line indicates the coordinate information on the left shoulder region.

As described above, since the coordinate information on the body key-point included in the target pose shape 20 is rendered to an image, each coordinate information may not only be recognized more easily, but also be converted to a shape more suitable as an input to image deep learning.

More specifically, the image application according to the embodiment may determine a pose type matched to the target category as the target pose type 20.

More specifically, the image application may store a pose type sample matched to each of a plurality of categories.

At this time, the image application may obtain and store pose type samples for each category based on a user input and/or a predetermined method (for example, image deep learning and/or big data technology).

Also, the image application may derive a pose type matched to a target category and determine the target pose type 20 based on the stored pose type samples for each category.

For example, when the target category is the full shot category, among at least one or more pre-stored pose type samples for each category, including a rear shot pose, a viewpoint shot pose, a full shot pose, a stand shot pose, and/or a miscellaneous pose shot pose, the image application may determine the full shot pose type as a target pose type 20.

As another embodiment, the image application may determine one of a plurality of pose type samples matched to a target category as the target pose type 20.

In other words, the image application may store a plurality of pose type samples matched to the respective categories.

At this time, the image application may have main pose type samples and sub-pose type samples within the pose type samples for each category.

Here, the main pose type sample may be a pose type sample among a plurality of pose type samples of a category determined as the target pose type 20 preferentially when the corresponding category is matched to the target category.

Also, the sub-pose type sample may be a pose type sample among a plurality of pose type samples of a category determined as the target pose type 20 according to a predetermined method (for example, selection by a user input) when the corresponding category is matched to the target category.

In other words, the image application according to another embodiment may derive a pose type sample matched to the target category and determine the target pose type 20 based on a main pose type sample and a sub-pose type sample for each category.

For example, when the target category is the full shot category, the image application may determine a main pose type sample matched to the full shot category preferentially as the target pose type 20 and determine any one of a plurality of sub-pose types (for example, a first sub-full shot pose and a second sub-full shot pose showing different poses) matched to the full shot category as the target pose type 20 according to a predetermined method (for example, a user selection).

In yet another embodiment, the image application may create a pose type matched to a target category using a network trained based on a deep learning scheme and use the created pose type as the target pose type 20.

As described above, being capable of determining the target pose type 20 to be applied to a virtual image using various methods, the image application may select a more accurate pose type to be applied to a virtual image, improve ease of choosing a pose type, and increase the completeness of a virtual image created through the pose type selection.

Also, the image application according to the embodiment may create a semantic label map based on the base image 10 and the target pose type 20 determined as above.

More specifically, the image application may input the base image 10 and the target pose type 20 information determined as above to the deep learning neural network 1 in conjunction with the image management server 400.

At this time, the target pose type 20 information input to the deep learning neural network 1 may be the information rendered to an image from the coordinate information on each body key-point included in the target pose type 20. In other words, the image application may input, to the deep learning neural network 1, the target pose type 20 information rendered to a graphic image from the coordinate information on a body part (for example, a face region, a shoulder region, an elbow region, a wrist region, a hip region, a knee region, and/or an ankle region) of the target pose type 20 according to a predetermined transformation method.

The image application may obtain a semantic label map for a target pose type 20 output from the deep learning neural network 1 which has received the base image 10 and the target pose type 20 information.

Here, the semantic label map according to the embodiment may be a map image that partitions a region within an input image into body key-points.

For example, the semantic label map may be a map image that partitions an input image into a plurality of regions including body key-points of a model such as a face region (including an eye region, a nose region, an ear region, and/or a neck region), a shoulder region, an elbow region, a wrist region, a hip region, a knee region, and/or an ankle region; and a product region (at this time, left and right parts of the entire body key-points may be distinguished from each other).

More specifically, the image application may obtain a pose semantic label map 21 based on the base image 10 and the target pose type 20 information.

Also, the image application may additionally obtain a base semantic label map for the base image 10. The image application according to the embodiment may obtain the base semantic label map in advance during deep learning processing for classifying product images into the respective categories.

In another embodiment, the image application may obtain the pose semantic label map 21 based on the base semantic label map of the base image 10 and the target pose type 20 information.

The pose semantic label map 21 according to the embodiment may be a semantic label map image created as at least part of the base image 10 is applied to the target pose type 20 through the trained image deep learning neural network 1.

Also, the base semantic label map according to the embodiment may be a map image in which the regions of the base image 10 are partitioned into a body region (for example, a face region (an eye region, a nose region, an ear region, and/or a neck region), a shoulder region, an elbow region, a wrist region, a hip region, a knee region, and/or an ankle region) and a product region through the trained image deep learning neural network 1.

The image application according to the embodiment may create a semantic label map based on a publicly known algorithm model (for example, U-net convolutional neural network), and the present disclosure does not limit the algorithm itself for creating the semantic label map.

Also, the embodiment of the present disclosure assumes that the image application creates a semantic label map based on the base image 10 and the target pose type 20 information in conjunction with the image management server 400; however, in various other embodiments, the image application may create a semantic label map without involving an external server.

Also, referring to FIG. 9, the image application according to the embodiment may obtain a virtual image 30 by performing deep learning based on a created semantic label map S207.

More specifically, the image application may input the target pose type 20 information and the pose semantic label map 21 to the deep learning neural network 1 (for example, U-net) to correspond to the base image 10 and the base semantic label map 11.

And the image application may obtain a virtual image 30 having the target pose type 20 as an output of the deep learning neural network 1 which has received the input.

In other words, the image application according to the embodiment may perform image processing based on the base image 10 and the target pose type 20; and the base semantic label map 11 and the pose semantic label map 21 created based thereon. Then the image application may obtain a virtual image 30 in which the pose type of the base image 10 is transformed into the target pose type 20 using a maximum amount of information.

The image application according to another embodiment may obtain a virtual image 30 using at least part of the base image 10 and the target pose type 20; and the base semantic label map 11 and the pose semantic label map 21 created based thereon.

The image application according to the embodiment may obtain a virtual image 30 using only the base image 10, the base semantic label map 11, and the pose semantic label map 21.

More specifically, the image application according to another embodiment may select data essential for creating a virtual image 30 (for example, the base image 10, the base semantic label map 11, and the pose semantic label map 21) and obtain the virtual image 30 by inputting the selected data to the deep learning neural network 1.

In other words, the image application according to another embodiment may implement a deep learning-based virtual image creation process operating more efficiently by performing image deep learning based on the least amount of data required for creating a virtual image 30.

As described above, the image application according to an embodiment of the present disclosure may easily create and provide product images at various viewpoints required to recognize a product on a shopping mall more accurately by creating and providing a virtual image 30 showing the product based on the target pose type 20, thereby not only improving the overall quality of a shopping mall server but also increasing the user convenience.

Returning again to FIG. 4, the image application creating a virtual image 30 having a pose type matched to a target category based on the product images as described above may input the created virtual image 30 to the matched category S109.

More specifically, the image application according to the embodiment may transmit the created virtual image 30 to the image automatic classification server 420 to classify the virtual image 30 into a category corresponding thereto.

Or, the image application may classify the created virtual image 30 into a category matched to the virtual image 30 without involving an external server.

Also, the image application according to an embodiment of the present disclosure may provide product image information for each category, the information rearranging classified product images including the created virtual image 30.

FIG. 10 is an example illustrating product image information for each category according to an embodiment of the present disclosure.

Referring to FIG. 10, product image information for each category according to an embodiment (hereinafter, collecting information) may be the information obtained by classifying and various product images displayed randomly on an online shopping mall into the respective categories and rearranging the classified various product images in consideration of the user convenience.

More specifically, the image application according to the embodiment, by itself or in conjunction with the image management server 40, may create product image information for each category by rearranging the product images to be easily recognized according to their category.

Also, the image application may provide an interface capable of performing various functional operations using the product image information for each category by including the interface in the product image information for each category.

More specifically, based on the product image information for each category, the image application according to the embodiment may provide product information for each product, a name of each category (for example, a pose type name), and/or product images for each category.

Also, the image application may provide a user interface that performs various functional operations according to a user input based on the product image information for each category.

For example, when one of a plurality of product images is selected from the product image information for each category, the image application may provide a user interface through which detailed information matched to the corresponding image (for example, a name and/or a price of a product within the corresponding image) may be checked.

In another example, through the product image information for each category, the image application may provide a user interface capable of changing the order of displaying a category of the product image information for each category based on a user input.

In yet another example, through the product image information for each category, the image application may provide a user interface capable of configuring whether to display a product image obtained from the shopping mall server 500 based on a user input separately from a virtual image 30 created based on deep learning.

As described above, by automatically classifying, arranging, and exposing a plurality of product images of a shopping mall according to their pose type, the image application according to an embodiment of the present disclosure may minimize inconvenience that may be caused when product images are displayed randomly on the shopping mall, reduce the cost required to construct product pages, improve usability of the shopping mall, and obtain an effect of sales increase accordingly.

Also, by providing a user interface through which product image information for each category created by automatic classification of a plurality of product images may be utilized more effectively, the image application may provide product image information for each category optimized for user requirements and accordingly, enhance satisfaction and usability for a shopping mall providing the plurality of product images.

As described above, when a product image for one product is required in addition to existing product images, a method for creating a virtual image based on deep learning according to an embodiment of the present disclosure creates a required product image based on deep learning and provides the required product image that should be supplemented for an effective display of the product quickly and conveniently without separate photographing or retouching work.

Also, a method for creating a virtual image based on deep learning according to an embodiment of the present disclosure provides product images as seen from various viewpoints for more accurate recognition of the product on a shopping mall by providing a required product image based on deep learning, thereby improving the overall quality of the shopping mall service and enhancing user convenience at the same time.

Also, a method for creating a virtual image based on deep learning according to an embodiment of the present disclosure classifies a plurality of product images automatically with respect to one product in consideration of user convenience, thereby minimizing an inconvenience caused when product images are displayed randomly on a shopping mall, reducing costs consumed for constructing product pages, improving the usability of the shopping mall, and obtaining an effect of increasing sales.

Also, the embodiments of the present disclosure described above may be implemented in the form of program commands which may be executed through various types of computer means and recorded in a computer-readable recording medium. The computer-readable recording medium may include program commands, data files, and data structures separately or in combination thereof. The program commands recorded in the computer-readable recording medium may be those designed and configured specifically for the present disclosure or may be those commonly available for those skilled in the field of computer software. Examples of a computer-readable recoding medium may include a magnetic medium such as a hard-disk, a floppy disk, and a magnetic tape; an optical medium such as a CD-ROM and a DVD; a magneto-optical medium such as a floptical disk; and a hardware device specially designed to store and execute program commands such as a ROM, a RAM, and a flash memory. Examples of program commands include not only machine code such as one created by a compiler but also high-level language code which may be executed by a computer through an interpreter and the like. The hardware device may be configured to be operated by one or more software modules to perform the operations of the present disclosure, and vice versa.

What is claimed is:

1. A method for creating a virtual image based on deep learning by an image application executed by a processor of a computing device, the method comprising:
obtaining a plurality of product images including one product;
classifying the obtained product images into a plurality of pose type categories according to a pose included in each of the obtained product images;
selecting at least one target pose type category from the plurality of pose type categories to create the virtual image;
creating a virtual image of a pose type corresponding to the selected target pose type category using at least one product image among the plurality of product images by the deep learning; and
outputting the created virtual image, and
wherein the selecting of the at least one target pose type category includes detecting an empty category to which no product image is classified among the plurality of pose type categories, and determining the detected empty category as the target pose type category.

2. The method of claim 1, wherein the virtual image is created to have the pose type corresponding to the selected target pose type category by inputting the at least one product image and information related to the pose type corresponding to the selected target pose type category to a pre-trained deep learning neural network.

3. The method of claim 1, wherein the creating of the virtual image of the pose type corresponding to the selected target pose type category includes determining at least one of the plurality of product images as a base image.

4. The method of claim 3, wherein the determining of the at least one of the plurality of product images as the base image includes determining, as the base image, a product image classified to a pose type category having a highest priority among the plurality of pose type categories, wherein each of the plurality of pose type categories has a respective preconfigured priority.

5. The method of claim 3, wherein the creating of the virtual image of the pose type corresponding to the selected target pose type category further includes creating a pose semantic label map of the pose type corresponding to the selected target pose type category by inputting the base image and information related to the pose type corresponding to the selected target pose type category to a pre-trained deep learning neural network.

6. The method of claim 5, wherein the creating of the virtual image of the pose type corresponding to the selected target pose type category further includes creating a base semantic label map which is a semantic label map of the base image.

7. The method of claim 5, wherein the creating of the virtual image of the pose type corresponding to the selected target pose type category further includes creating the virtual image by inputting the pose semantic label map and the base image to the pre-trained deep learning neural network.

8. The method of claim 5, wherein the creating of the virtual image of the pose type corresponding to the selected target pose type category includes creating the virtual image having the pose type corresponding to the selected target pose type category by inputting the information related to the pose type corresponding to the selected target pose type category and the pose semantic label map to the pre-trained deep learning neural network to correspond to the base image and the base semantic label map.

9. A system for creating a virtual image based on deep learning, the system comprising:
at least one processor; and
a memory storing instructions for an image application executed by the at least one processor, the instructions for the image application comprising:
obtaining a plurality of product images including one product, classifying the obtained product images into a plurality of pose type categories according to a pose included in each of the obtained product images, selecting a target pose type category from the plurality of pose type categories to create the virtual image, creating a virtual image of a pose type corresponding to the selected target pose type category using at least one product image among the plurality of product images by the deep learning, and outputting the created virtual image, and wherein the instructions for the image application include detecting an empty category to which no product image is classified among the plurality of pose type categories, and determining the detected empty category as the target pose type category.

10. The system of claim 9, wherein the instructions for the image application include determining at least one of the plurality of product images as a base image.

11. The system of claim 10, wherein the instructions for the image application include determining, as the base image, a product image classified to a pose type category having a highest priority among the plurality of pose type categories, wherein each of the plurality of pose type categories has a respective preconfigured priority.

12. The system of claim 11, wherein the instructions for the image application include creating a pose semantic label map of the pose type corresponding to the selected target pose type category by inputting the base image and information related to the pose type corresponding to the selected target pose type category to a pre-trained deep learning neural network.

13. The system of claim 12, wherein the instruction for the image application include creating a base semantic label map which is a semantic label map of the base image.

14. The system of claim 13, wherein the instructions for the image application include creating the virtual image by inputting the pose semantic label map and the base image to the pre-trained deep learning neural network.

15. The system of claim 14, wherein the instructions for the image application include creating the virtual image having the pose type corresponding to the selected target pose type category by inputting the information related to the pose type corresponding to the selected target pose type category and the pose semantic label map to the pre-trained deep learning neural network to correspond to the base image and the base semantic label map.

* * * * *